United States Patent
Kayaba

(10) Patent No.: US 8,921,247 B2
(45) Date of Patent: Dec. 30, 2014

(54) OPTICAL GLASS, PREFORM FOR PRESS-MOLDING AND OPTICAL ELEMENT FORMED FROM PREFORM

(71) Applicant: Asahi Glass Company, Limited, Chiyoda-ku (JP)

(72) Inventor: Noriyoshi Kayaba, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 13/947,454

(22) Filed: Jul. 22, 2013

(65) Prior Publication Data

US 2014/0024519 A1    Jan. 23, 2014

(30) Foreign Application Priority Data

Jul. 23, 2012  (JP) .................................. 2012-162535

(51) Int. Cl.
*C03C 3/068* (2006.01)

(52) U.S. Cl.
CPC ...................................... *C03C 3/068* (2013.01)
USPC ..................... 501/78; 501/50; 501/51; 501/79

(58) Field of Classification Search
CPC .......... C03C 3/15; C03C 3/155; C03C 3/066; C03C 3/068
USPC .......................................... 501/50, 51, 78, 79
See application file for complete search history.

(56) References Cited

U.S. PATENT DOCUMENTS

| 7,955,998 B2 * | 6/2011 | Hayashi et al. | 501/51 |
| 2010/0304950 A1 * | 12/2010 | Tomeno et al. | 501/78 |
| 2013/0231237 A1 | 9/2013 | Kayaba | |

FOREIGN PATENT DOCUMENTS

| JP | 2009-263228 | 11/2009 |
| JP | 2011-6318 | 1/2011 |
| WO | WO 2009/072335 A1 | 6/2009 |

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention relates to an optical glass including, in terms of mass % on the basis of oxides, $B_2O_3$: 10% to 20%, $SiO_2$: 0.5% to 12%, ZnO: 5% to 19%, $Ta_2O_5$: 3% to 17%, $Li_2O$: 0.2% to 3%, $ZrO_2$: 0.6% to 4.9%, $WO_3$: 6.1% to 20%, $La_2O_3$: 32.5% to 50%, and $Y_2O_3$: 0.2% or more and less than 1.5%, in which a mass fraction ($La_2O_3/Y_2O_3$) of a content of $La_2O_3$ to a content of $Y_2O_3$ in terms of mass % is 40 or higher, and the optical glass has optical constants of a refractive index $n_d$ of 1.83 to 1.88 and an Abbe's number $\upsilon_d$ of 39 to 42.

15 Claims, 1 Drawing Sheet

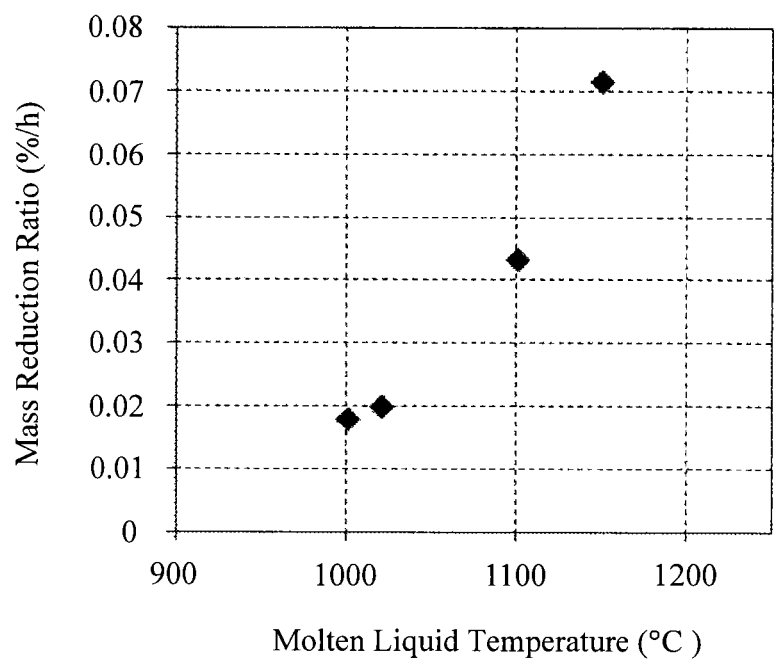

US 8,921,247 B2

OPTICAL GLASS, PREFORM FOR PRESS-MOLDING AND OPTICAL ELEMENT FORMED FROM PREFORM

FIELD OF THE INVENTION

The present invention relates to an optical glass having a high refractive index and a low dispersion property, a preform for high-precision press-molding and an optical element using the same.

BACKGROUND OF THE INVENTION

In optical systems such as a digital camera, a glass-made optical lens, in particular, an aspherical lens having such optical properties as a high refractive index and a low dispersion property is used. Currently, high-precision press-molding techniques using a molding tool are developed, and an aspherical lens is manufactured by a high-precision press-molding method.

As the high-precision press-molding method, there is a reheat press method in which a preform having a predetermined mass and shape is obtained from a glass molten liquid with a dropping, and the obtained preform is put into a mold, followed by reheating and press-molding.

In order to improve the productivity of the reheat press method, a high-precision preform is necessary. In the case where a preform which has no devitrification and striae and has a predetermined mass is subject to the high-precision press-molding, a polishing step is unnecessary. On the other hand, it is preferable that a preform has a low glass transition temperature ($T_g$) from the viewpoint of improving the durability of a mold.

For example, a preform is manufactured by melting glass raw materials in a platinum tank or the like at a high temperature; lowering a molten liquid temperature to cause the molten liquid to flow through a pipe; dropping the molten liquid from a platinum nozzle; and cooling the molten liquid in a receiving mold. The molten liquid temperature in the pipe is held at an approximately liquidus temperature ($T_L$) from the viewpoints of improving productivity and preventing devitrification. The liquidus temperature $T_L$ described herein represents the minimum temperature at which crystals do not precipitate in the molten liquid when the glass molten liquid is held. In the case where crystals precipitate in the molten liquid, the glass is devitrified during the manufacture of a preform, which causes appearance defects. Therefore, at the time of manufacturing a preform, the molten liquid temperature is held to be high to the extent that devitrification does not occur.

Meanwhile, in the case where the molten liquid temperature is high, components are likely to volatilize from the molten liquid surface during the dropping of the molten liquid from the nozzle and during cooling in the receiving mold. In the case where the components volatilize, the glass composition on the molten liquid surface becomes nonuniform and striae are generated on the glass surface, which causes appearance defects. Therefore, during preform-molding, the molten liquid temperature is held to be low to the extent that the components do not volatilize.

As the composition of an optical glass having a high refractive index and a low dispersion property, a glass containing $B_2O_3$—$La_2O_3$ as a main component is widely used. Since $B_2O_3$—$La_2O_3$-based glass has a high glass transition temperature $T_g$, the glass transition temperature $T_g$ is reduced by adding alkali components such as $Li_2O$. However, in the case where an alkali component is added, a refractive index $n_d$ is decreased. Therefore, there is a concern that the desired optical constants may not be obtained.

Patent Documents 1 and 2 disclose $B_2O_3$—$La_2O_3$-based glasses containing 0.2 mass % to 3 mass % of $Li_2O$; and a total content ($La_2O_3$+$Gd_2O_3$+$Y_2O_3$) of 35 mass % to 60 mass % of $La_2O_3$, $Gd_2O_3$, and $Y_2O_3$, in which a glass transition temperature $T_g$ is 630° C. or lower and is suitable for press-molding. These glasses have optical constants of a refractive index $n_d$ of 1.82 to 1.86 and an Abbe's number $\upsilon_d$ of 37 to 44.

However, these glasses have a high liquidus temperature $T_L$ of 1000° C. or higher. Therefore, in the case where the molten liquid is held at the liquidus temperature $T_L$ or higher, $B_2O_3$ and an alkali component volatilize and there is a concern that surface striae may be generated at the time of preform-molding.

On the other hand, a manufacturing method, in which the generation of striae on a preform surface is suppressed even when a liquidus temperature $T_L$ is high and a molten liquid temperature is high, is known. Patent Document 3 discloses a method in which, when the molten liquid is dropped during preform-molding, gas is blown toward the molten liquid to rapidly lower a surface temperature and thus to suppress the volatilization of components. According to this method, the volatilization of components can be suppressed and surface striae can be prevented; however, most of gas blowing conditions are obtained from experience and the reproducibility is low.

[Patent Document 1] JP-A-2011-6318
[Patent Document 2] WO 2009/72335
[Patent Document 3] JP-A-2009-263228

SUMMARY OF THE INVENTION

As described above, in the composition in which a $B_2O_3$—$La_2O_3$ system contains an alkali component, there is a problem that surface striae are generated due to the volatilization of components. On the other hand, in the case where the molten liquid temperature is lowered due to the high liquidus temperature $T_L$, there is a problem that crystals precipitate in the molten liquid and the glass is devitrified.

The invention has been made in order to solve the above-discussed problems. An object of the invention is to provide a glass having optical properties of a high refractive index and a low dispersion property, and having superior press-molding property, in which, even when a liquidus temperature $T_L$ thereof is high, the generation of striae on a glass surface is suppressed at the time of preform-molding and devitrification is not likely to occur.

The present inventors have focused on the time at which crystals precipitate in molten liquid, that is, the time until the devitrification of the glass starts (hereinafter, referred to as "devitrification start time"), at a temperature lower than the liquidus temperature $T_L$; and have conceived the present invention. According to the present invention, even when a preform is molded at the liquidus temperature $T_L$ or lower, the devitrification start time is sufficiently long, and thus devitrification can be prevented.

The present inventors have found that, in $B_2O_3$—$La_2O_3$-based glass, the devitrification start time depends on a content of $Y_2O_3$ and a mass fraction ($La_2O_3/Y_2O_3$) of a content of $La_2O_3$ to the content of $Y_2O_3$ in terms of mass %, and have conceived the present invention.

The optical glass of the invention (hereinafter referred to as the glass of the invention) comprises, in terms of mass % on the basis of oxides, $B_2O_3$: 10% to 20%, $SiO_2$: 0.5% to 12%, ZnO: 5% to 19%, $Ta_2O_5$: 3% to 17%, $Li_2O$: 0.2% to 3%, $ZrO_2$: 0.6% to 4.9%, $WO_3$: 6.1% to 20%, $La_2O_3$: 32.5% to 50%, and $Y_2O_3$: 0.2% or more and less than 1.5%, wherein a mass fraction ($La_2O_3/Y_2O_3$) of the content of $La_2O_3$ to the content of $Y_2O_3$ in terms of mass % is 40 or higher, and the optical glass has optical constants of a refractive index $n_d$ of 1.83 to 1.88 and an Abbe's number $\upsilon_d$ of 39 to 42.

By controlling the content of $Y_2O_3$ to be low and controlling a mass fraction ($La_2O_3/Y_2O_3$) of the content of $La_2O_3$ to the content of $Y_2O_3$ in terms of mass % to be 40 or higher, in the case where the glass is held at a liquidus temperature $T_L$ or lower, the devitrification start time can be sufficiently lengthened.

Since the devitrification start time at the liquidus temperature $T_L$ or lower is long, the devitrification of the glass can be suppressed even when a molten liquid has a low temperature. Therefore, since the molten liquid temperature can be lowered during preform-molding, the volatilizing amount of components can be reduced. As a result, $B_2O_3$—$La_2O_3$-based glass can be molded at a low temperature, and thus a preform having desired optical constants and having no appearance defects can be obtained.

BRIEF DESCRIPTION OF THE DRAWING

FIG. 1 is a diagram illustrating a volatilizing test of the glass of the present invention in a temperature range around a liquidus temperature $T_L$ thereof.

DETAILED DESCRIPTION OF THE INVENTION

The reason for setting each component range of the glass of the present invention will be described below.

In the glass of the invention, $B_2O_3$ is an essential component for forming a glass network and lowering the liquidus temperature $T_L$. In the glass of the invention, a content of $B_2O_3$ is 10 mass % to 20 mass %. In the case where the content of $B_2O_3$ is less than 10 mass %, it is difficult to form a glass, which is not preferable. In order to obtain a glass having superior devitrification resistance, the content of $B_2O_3$ is set to be 10 mass % or more. The content of $B_2O_3$ is more preferably 11 mass % or more and still more preferably 12 mass % or more because the liquidus temperature $T_L$ can be lowered and the Abbe's number $\upsilon_d$ can be increased.

On the other hand, in the glass of the invention, in the case where the content of $B_2O_3$ is greater than 20 mass %, there is a concern that the refractive index $n_d$ may be reduced or chemical durability such as water resistance may be deteriorated. In the glass of the invention, the content of $B_2O_3$ is 20 mass % or less. In case of increasing the refractive index $n_d$, the content of $B_2O_3$ is preferably 19 mass % or less and more preferably 18.5 mass % or less. Incidentally, the content of $B_2O_3$ is, in terms of mol %, 24 mol % to 45 mol %, preferably 25 mol % to 40 mol %, and more preferably 26 mol % to 35 mol %.

In the glass of the invention, $SiO_2$ is an essential component which is effective for stabilizing the glass and suppressing devitrification during high-temperature molding. In the glass of the invention, a content of $SiO_2$ is 0.5 mass % to 12 mass %. In the case where the content of $SiO_2$ is greater than 12 mass %, there is a concern that the molding temperature may be increased, and the refractive index $n_d$ may be reduced. The content of $SiO_2$ is preferably 11 mass % or less and more preferably 10 mass % or less.

On the other hand, in the case where the content of $SiO_2$ is 0.5 mass % or more, devitrification during high-temperature molding can be suppressed, or the viscosity of the glass molten liquid can be controlled. The content of $SiO_2$ is preferably 1 mass % or more and more preferably 2 mass % or more. Incidentally, the content of $SiO_2$ is, in terms of mol %, 3 mol % to 20 mol %, preferably 6 mol % to 18.5 mol %, and more preferably 9 mol % to 17 mol %.

In the glass of the invention, ZnO is an essential component for stabilizing the glass and lowering the molding temperature and the melting temperature. In the glass of the invention, a content of ZnO is 5 mass % to 19 mass %. In the case where the content of ZnO is less than 5 mass %, there is a concern that the glass may be unstable, or the molding temperature may be increased. The content of ZnO is preferably 6 mass % or more and more preferably 6.5 mass % or more.

On the other hand, in the glass of the invention, in the case where the content of ZnO is greater than 19 mass %, there is a concern that the stability of the glass and chemical durability may be deteriorated. The content of ZnO is preferably 18 mass % or less and is more preferably 17 mass % or less. Incidentally, the content of ZnO is, in terms of mol %, 10 mol % to 30 mol %, preferably 11 mol % to 28 mol %, and more preferably 12 mol % to 26 mol %.

In the glass of the invention, $Ta_2O_5$ is an essential component for stabilizing the glass, improving the refractive index $n_d$, and suppressing devitrification during molding from the molten liquid. In the glass of the invention, a content of $Ta_2O_5$ is 3 mass % to 17 mass %. In the case where the content of $Ta_2O_5$ is small, there is a concern that the refractive index $n_d$ may be reduced; and the liquidus temperature $T_L$ may be increased. Therefore, the content of $Ta_2O_5$ is 3 mass % or more. The content of $Ta_2O_5$ is preferably 5 mass % or more and more preferably 8 mass % or more.

On the other hand, in the case where the content of $Ta_2O_5$ is excessively large, the melting temperature is increased and the specific gravity of the glass is increased. In addition, in the case where the content of $Ta_2O_5$ is large, crystals containing Ta (for example, $LaTaO_7$ or $LiTa_3O_7$) are likely to precipitate at the liquidus temperature $T_L$ or lower. Furthermore, since $Ta_2O_5$ is a rare element and is expensive, the production cost is increased. Therefore, in the glass of the invention, the content of $Ta_2O_5$ is 17 mass % or less. The content of $Ta_2O_5$ is preferably 16 mass % or less and more preferably 15 mass % or less. Incidentally, the content of $Ta_2O_5$ is, in terms of mol %, 1 mol % to 8 mol %, preferably 1.5 mol % to 7 mol %, and more preferably 2 mol % to 6 mol %.

In the glass of the invention, $Li_2O$ is an essential component for stabilizing the glass and lowering the press-molding temperature and the melting temperature. In the glass of the invention, a content of $Li_2O$ is 0.2 mass % to 3 mass %. In the case where the content of $Li_2O$ is less than 0.2 mass %, there is a concern that the molding temperature may be increased. The content of $Li_2O$ is preferably 0.25 mass % or more and more preferably 0.3 mass % or more.

On the other hand, in the case where the content of $Li_2O$ is greater than 3 mass %, devitrification is likely to occur and there is a concern that chemical durability may be deteriorated, or the volatilization of components may be severe during melting. The content of $Li_2O$ is preferably 2 mass % or less and more preferably 1 mass % or less. Incidentally, the content of $Li_2O$ is, in terms of mol %, 0.5 mol % to 5 mol %, preferably 1 mol % to 4.5 mol %, and more preferably 1.4 mol % to 4 mol %.

In the glass of the invention, $ZrO_2$ is an essential component for stabilizing the glass, increasing the refractive index $n_d$, and suppressing devitrification during glass preform-molding. In the glass of the invention, a content of $ZrO_2$ is 0.6 mass % to 4.9 mass %. In the case where the content of $ZrO_2$ is greater than 4.9 mass %, there is a concern that the molding temperature may be increased, and the Abbe's number $\upsilon_d$ may be reduced. In addition, in the case where the content of $ZrO_2$ is greater than 4.9 mass %, $ZrO_2$ is likely to precipitate at the liquidus temperature $T_L$ or lower and there is a concern that the glass may be unstable, and the liquidus temperature $T_L$ may be increased.

The content of $ZrO_2$ is preferably 4.8 mass % or less, more preferably 4.7 mass % or less, and still more preferably 4.5 mass % or less. On the other hand, in order to obtain the addition effects, the content of $ZrO_2$ is preferably 0.8 mass % or more, more preferably 1.0 mass % or more, and still more preferably 1.5 mass % or more. In addition, the content of $ZrO_2$ in the glass of the invention is, in terms of mol %, 0.5 mol % to 10 mol %, preferably 0.8 mol % to 8 mol %, and more preferably 1.1 mol % to 6 mol %.

In the glass of the invention, $WO_3$ is an essential component which is effective for stabilizing the glass, improving the refractive index $n_d$, and efficiently suppressing devitrification during high-temperature molding. In the glass of the invention, a content of $WO_3$ is 6.1 mass % to 20 mass %. In the case where the content of $WO_3$ is less than 6.1 mass %, there is a concern that the refractive index $n_d$ may be reduced, and the liquidus temperature $T_L$ may be increased. The content of $WO_3$ is preferably 6.3 mass % or more and more preferably 6.5 mass % or more. On the other hand, in the case where the content of $WO_3$ is greater than 20 mass %, the Abbe's number $\upsilon_d$ is reduced and the desired low dispersion property cannot be obtained. Therefore, the content of $WO_3$ is preferably 16 mass % or less and more preferably 12 mass % or less. Incidentally, the content of $WO_3$ is, in terms of mol %, 3 mol % to 12 mol %, preferably 3.5 mol % to 10 mol %, and more preferably 4 mol % to 8 mol %.

In the glass of the invention, $La_2O_3$ is an essential component for increasing the refractive index $n_d$, increasing the Abbe's number $\upsilon_d$, and improving chemical durability. In the glass of the invention, a content of $La_2O_3$ is 32.5 mass % to 50 mass %. In the case where the content of $La_2O_3$ is less than 32.5 mass %, there is a concern that the refractive index $n_d$ may be reduced. The content of $La_2O_3$ is preferably 32.7 mass % or more and more preferably 33 mass % more.

On the other hand, in the case where the content of $La_2O_3$ is greater than 50 mass %, there is a concern that it may be difficult to form glass, the molding temperature may be increased, and the liquidus temperature $T_L$ may be increased. The content of $La_2O_3$ is preferably 45 mass % or less and more preferably 40 mass % or less. Incidentally, the content of $La_2O_3$ is, in terms of mol %, is 10 mol % to 25 mol %, preferably 12.5 mol % to 22 mol %, and preferably 15 mol % to 19 mol %.

In the glass of the invention, $Y_2O_3$ is, as is the case with $La_2O_3$, an essential component for increasing the refractive index $n_d$, increasing the Abbe's number $\upsilon_d$, and improving chemical durability. Furthermore, $Y_2O_3$ is also a component for stabilizing the glass and increasing the viscosity as compared to the other oxides of rare earth elements. In the glass of the invention, a content of $Y_2O_3$ is 0.2 mass % or more and less than 1.5 mass %.

The content of $Y_2O_3$ is preferably 0.3 mass % or more and more preferably 0.4 mass % or more. On the other hand, in the case where the content of $Y_2O_3$ is 1.5 mass % or more, there is a concern that the devitrification start time at 1000° C. may be shortened; and the glass may be devitrified during preform-molding. Therefore, the content of $Y_2O_3$ is preferably 1.4 mass % or less and more preferably 1.3 mass % or less. Incidentally, the content of $Y_2O_3$ is, in terms of mol %, 0.1 mol % to 1.5 mol %, preferably 0.2 mol % to 1.2 mol %, and more preferably 0.3 mol % to 0.9 mol %.

In the glass of the invention, a mass fraction ($La_2O_3/Y_2O_3$) of the content of $La_2O_3$ to the content of $Y_2O_3$ in terms of mass % is 40 or more. In the case where the mass fraction is in this range, the devitrification start time of the glass molten liquid can be lengthened. The mass fraction is preferably 41 or more and more preferably 42 or more.

In the glass of the invention, a total content ($Ta_2O_5+La_2O_3$) of $Ta_2O_5$ and $La_2O_3$ is preferably greater than 45 mass %. In the case where the total content of the above-described two components is in this range, the refractive index $n_d$ can be increased, the Abbe's number $\upsilon_d$ can be increased, and the devitrification start time can be increased. The total content of the above-described two components is more preferably 45.5 mass % or more and still more preferably 46 mass % or more.

In the glass of the invention, $Gd_2O_3$ is not an essential component, but by adding $Gd_2O_3$ with $La_2O_3$, the refractive index $n_d$ is increased, the Abbe's number $\upsilon_d$ is increased, and the stability of the glass is improved. However, in the case where a large amount of $Gd_2O_3$ is introduced, there is a concern that the liquidus temperature $T_L$ may be increased; and crystal $GdBO_3$ other than $LaBO_3$ may precipitate at the liquid temperature $T_L$ or lower, which causes a problem in the control of preform-molding property. Therefore, in the glass of the invention, a content of $Gd_2O_3$ is limited to 0 mass % 15 mass %. In order to achieve a high refractive index and to stabilize the glass, the content of $Gd_2O_3$ is more preferably 1 mass % or more and still more preferably 2 mass % or more.

On the other hand, in the case where the content of $Gd_2O_3$ is greater than 15 mass %, there is a concern that the liquidus temperature $T_L$ may be increased, and the refractive index $n_d$ may be reduced. Therefore, the content of $Gd_2O_3$ is more preferably 14 mass % or less and still more preferably 13 mass % or less. Incidentally, the content of $Gd_2O_3$ is, in terms of mol %, 0 mol % to 8 mol %, preferably 0.5 mol % to 7 mol %, and more preferably 1 mol % to 6 mol %.

The glass of the invention does not substantially contain $Nb_2O_5$ because there is a concern that the Abbe's number $\upsilon_d$ may be reduced, or the liquidus temperature $T_L$ may be increased. In this specification, the term "does not substantially contain" represents that the components are not intentionally added, and this does not exclude components containing as unavoidable impurities. Specifically, "not substantially contain" represents limiting the content to be 0.1 mass % or less.

In the glass of the invention, $TiO_2$ is a component in which there are effects of stabilizing the glass, improving the refractive index $n_d$, and the like; whereas, devitrification is likely to occur. Therefore, it is preferable that the glass of the invention do not substantially contain $TiO_2$.

In the glass of the invention, $Yb_2O_3$ is not an essential component, but 0 mass % to 10 mass % of $Yb_2O_3$ may be contained in order to improve the refractive index $n_d$, to suppress devitrification during high-temperature molding, or the like. In the case where the content of $Yb_2O_3$ is greater than 10 mass %, there is a concern that the glass may be unstable, the molding temperature may be excessively increased, and the specific gravity may be excessively increased. Therefore, the content of $Yb_2O_3$ is preferably 5 mass % or less and is more preferably not substantially contained.

In the glass of the invention, any of $Al_2O_3$, $Ga_2O_3$, or $GeO_2$ is not an essential component, but 0 mass % to 10 mass % of each component may be contained in order to stabilize the glass, to control the refractive index $n_d$, or the like. In the case where a content of $Al_2O_3$, $Ga_2O_3$, or $GeO_2$ is greater than 10 mass %, there is a concern that the Abbe's number $\upsilon_d$ may be reduced. The content of $Al_2O_3$, $Ga_2O_3$, or $GeO_2$ is more preferably 8 mass % or less and still more preferably 6 mass % or less. In addition, since $Ga_2O_3$ and $GeO_2$ are extremely rare and expensive components, it is preferable that $Ga_2O_3$ and $GeO_2$ are not substantially contained.

In the glass of the invention, any of BaO, SrO, CaO or MgO is not an essential component, but 0 mass % to 15 mass % of each component may be contained in order to stabilize the glass, to increase the Abbe's number $\upsilon_d$, to reduce the molding temperature, and to reduce the specific gravity of the glass. In the case where the content of each component of BaO, SrO, CaO or MgO is greater than 15 mass %, there is a concern that the glass may be unstable; or the refractive index $n_d$ may be reduced.

In addition, the glass of the invention may contain 0 mass % to 5 mass % of $Na_2O$, $K_2O$, $Rb_2O$, or $Cs_2O$ in a total content of components in order to further stabilize the glass, to control the refractive index $n_d$, to control the specific gravity, to reduce the melting temperature, and the like. In the case where the total content of $Na_2O$, $K_2O$, $Rb_2O$, or $Cs_2O$ is greater than 5 mass %, there is a concern that the glass may be unstable, the refractive index $n_d$ may be reduced, the hardness may be reduced, and the chemical durability may be deteriorated. In addition, in the case where the hardness or the chemical durability is emphasized, it is preferable that any of $Na_2O$, $K_2O$, $Rb_2O$, or $Cs_2O$ is not substantially contained.

In the glass of the invention, optional components other than the above-described components can be selected according to required properties. For example, in the case where a high refractive index and a low glass transition temperature are emphasized, 0 mass % to 4 mass % of SnO may be contained. Likewise, in the case where the high refractive index is emphasized, $TeO_2$ and/or $Bi_2O_3$ having each content or a total content of 0 mass % to 6 mass % may be contained. In the case where the content of $TeO_2$ and/or $Bi_2O_3$ is greater than 6 mass %, there is a concern that the glass may be unstable, or the transparency may be significantly deteriorated. However, in order to increase the Abbe's number $\upsilon_d$, it is preferable that any of $TeO_2$ or $Bi_2O_3$ is not substantially contained.

For example, for refinement and the like, the glass of the invention may contain, for example, 0 mass % to 1 mass % of $Sb_2O_3$. Incidentally, a content of $Sb_2O_3$ is, in terms of mol %, 0 mol % to 1 mol %.

The glass of the invention may further contain the other components within a range not impairing the effects of the present invention. In the case where such components are contained, a total content of the components is preferably 10 mass % or less, more preferably 8 mass % or less, and still more preferably 6 mass % or less, or 5 mass % or less. Incidentally, the total content of the components is, in terms of mol %, 10 mol % or less, more preferably 8 mol % or less, and still more preferably 6 mol % or less, or 5 mol % or less. Basically, it is even still more preferable that the glass of the invention is formed from the above-described components.

In order to reduce environmental burden, it is preferable that the glass of the invention does not substantially contain any of lead (PbO), arsenic ($As_2O_3$), thallium ($Tl_2O$), thorium ($ThO_2$), and cadmium (CdO). In addition, in the case where fluorine is contained, the thermal expansion coefficient is increased, there are adverse effects on mold-releasing property and molding property, and components are likely to volatilize. As a result, the composition of an optical glass is likely to be nonuniform at the time of the melting of the glass. In addition, since there is a problem in that, for example, the durability of a mold such as a mold-releasing film deteriorates during high-precision molding. It is preferable that the glass of the invention do not substantially contain fluorine.

In order to prevent coloring or the like, it is preferable that the glass of the invention do not substantially contain transition metal compounds such as $Fe_2O_3$. For example, even if the transition metal compounds are unavoidably incorporated from raw materials, it is preferable that a total content of the transition metal compounds in the glass of the invention is 0.01 mass % or less.

As the optical properties of the glass of the invention, the refractive index $n_d$ is 1.83 to 1.88. In the case where a refractive index $n_d$ is 1.83 or higher, it is suitable for a reduction in size of a lens and a reduction in thickness of a lens. The refractive index $n_d$ is preferably 1.845 or more. On the other hand, in the case where the refractive index $n_d$ of the glass of the invention is higher than 1.88, the Abbe's number $\upsilon_d$ is reduced and there are adverse effects on the other thermophysical properties. The refractive index $n_d$ of the glass of the invention is preferably 1.87 or less. Moreover, the Abbe's number $\upsilon_d$ of the glass of the invention is 39 to 42. In the case where the Abbe's number $\upsilon_d$ is 39 or more, the dispersion property of the glass is low. Also, in the case where the Abbe's number $\upsilon_d$ is 42 or less, the devitrification resistance of the glass is superior.

In the case where a glass transition temperature $T_g$ of the glass of the invention is 630° C. or less, a mold is not likely to deteriorate during high-precision press-molding, which is preferable. The glass transition temperature $T_g$ is more preferably 625° C. or less and still more preferably 620° C. or less.

The specific gravity of the glass of the invention is preferably 5.3 or less. In the case where the specific gravity is greater than 5.3, the mass of an optical system, which is used as optical elements such as an optical lens, is increased. As a result, there is a concern that the mass of an optical system may apply a load to a driving system of the lens. Therefore, the specific gravity of the glass is more preferably 5.27 or less and still more preferably 5.25 or less.

The liquidus temperature $T_L$ of the glass of the invention is preferably 1100° C. or less. In the case where the liquidus temperature $T_L$ is higher than 1100° C., a molded product is likely to be devitrified at the time of high-temperature molding, and a carbon or heat-resistant alloy, which is used as a receiving mold during high-temperature molding, deteriorates, which is not preferable. The liquidus temperature $T_L$ of the glass of the invention is more preferably 1090° C. or less and still more preferably 1080° C. or less. The liquidus temperature $T_L$ is defined as the minimum temperature at which crystals are not produced in the glass molten liquid in the case where the temperature is held for 1 hour.

In the case where a liquidus temperature viscosity $\eta_{TL}$ of the glass of the invention is 5 dPa·s or more, preform-molding property is superior, which is preferable. The liquidus temperature viscosity $\eta_{TL}$ is more preferably 6 dPa·s or more and still more preferably 7 dPa·s or more.

The present inventors have found that, in the case where the glass molten liquid temperature was higher than 1000° C. in $B_2O_3$—$La_2O_3$-based glass, glass components were likely to volatilize. A volatilizing test of a glass according to Example 1 of Examples in a temperature range around a liquidus temperature $T_L$ thereof is illustrated in FIG. 1. In the volatilizing test, it was found that, in the case where the molten liquid temperature is 1000° C. or more, the mass reduction ratio of the glass was increased. In the case where the mass reduction ratio is increased, components volatilize, which may cause surface striae.

The mass reduction ratio in the volatilizing test is obtained by measuring changes in mass when the glass is held at a predetermined temperature. In this specification, the mass production ratio represents the value measured as follows. First, a $mass_1$ (unit: g) of a 1 $cm^3$ glass block and a $mass_2$ (unit: g) of a platinum dish are measured. Next, the glass block is placed on the platinum dish and is held at a predetermined temperature for 1 hour. Then, a total $mass_3$ (unit: g) of the glass block and the platinum dish is measured. From the mass obtained as above, the mass change ratio is calculated according to the following expression (1).

$$\text{Mass Change Ratio}(\%/h) = \{Mass_1 - (Mass_3 - Mass_2)/Mass_1 \times 100 \tag{1}$$

In the present invention, in order to suppress surface striae, the mass reduction ratio at 1000° C. is preferably 0.05%/h or less, more preferably 0.04%/h or less, and still more preferably 0.03%/h or less.

In addition, in the $B_2O_3$—$La_2O_3$-based glass according to the present invention, the mass reduction ratio is increased at a temperature higher than 1000° C. and striae are generated. Therefore, the molding temperature of a preform is preferably 1000° C. or less.

On the other hand, as described above, in the case where the glass molten liquid temperature is the liquidus temperature $T_L$ or less, crystals are likely to precipitate in the glass molten liquid and the glass is likely to be devitrified. However, in the glass in which the devitrification start time is sufficiently long, a preform, in which surface striae and devitrification are suppressed, can be formed.

As a result of thorough investigation, the present inventors found that the devitrification start time in $B_2O_3$—$La_2O_3$-based glass depends on a content of $Y_2O_3$ in the glass and $La_2O_3/Y_2O_3$. As a result, a high-quality $B_2O_3$—$La_2O_3$-based glass preform is obtained in which the liquidus temperature $T_L$ is higher than 1000° C., such optical properties as a high refractive index and a low dispersion property are obtained, and appearance defects such as devitrification and striae are solved. Furthermore, by press-molding a perform having no defectiveness and uniform size to prepare an optical element, it is capable of producing a high quality optical element in large quantities and high productivity, and of improving productivity.

The devitrification start time is preferably 500 seconds or longer although depending on manufacturing facilities of the glass. The devitrification start time is more preferably 750 seconds or longer, still more preferably 1000 seconds or longer, and most preferably 1250 seconds or longer. It is preferable that the devitrification start time is longer because devitrification is not likely to occur during the formation of a preform and that the glass is applicable to various facilities.

In this specification, the devitrification start time represents the time measured according to a hot-thermocouple method. In the hot-thermocouple method, the measurement can be performed using a hot-thermocouple apparatus (manufactured by Texcell Corporation). First, a small piece of the glass is held between tip end portions of a U-shaped thermocouple, which is set in a thermocouple holder, and the thermocouple holder is set in a chamber. Next, the sample is heated to 1250° C., is held at the temperature for 3 minutes, is rapidly cooled to 1000° C., and is held at the temperature. During the time, the state of the glass is observed with a microscope installed in the front surface of the chamber. The time until crystals starts to precipitate in the glass molten liquid after being held at 1000° is the devitrification start time.

Since the glass of the invention has the above-described properties, an optical design can be easily performed and the glass of the invention is suitable for an optical element, in particular, for an aspherical lens used for a digital camera and the like.

EXAMPLES

Hereinbelow, specific aspects of the present invention will be described. However, the present invention is not limited thereto. Table 1 is shown in terms of mass %, and Table 2 is shown in terms of mol %. Examples 1 and 2 are working examples according to the present invention, and Examples 3 and 4 are comparative examples. In addition, Example 3 is Example 16 (of working example) in Patent Document 2, and Example 4 is Example 10 (of working example) in Patent Document 1. Incidentally, Examples 5 and 6 are reference examples of a glass material which can be preform-molded, and are examples in which the refractive index $n_d$ is approximately 1.88 and the Abbe's number $\upsilon_d$ is approximately 37.

As a method of preparing raw materials, the following raw materials were prepared so as to obtain a glass having the composition shown in Table 1, were put into a platinum crucible, and were melted at 1250° C. to 1450° C. for 2 hours. At this time, stirring was performed with a platinum stirrer for 0.5 hours to homogenize the molten glass. The homogenized molten glass was caused to flow, was molded into a plate-like shape, was held at a temperature of $T_g+10°$ C. for 4 hours, and slowly cooled to room temperature at a cooling ratio of $-1°$ C./min. The prepared glass sample has a shape of length 40 mm×width 40 mm×thickness 10 mm. In addition, in the case where physical properties were evaluated, this glass sample was cut for the evaluation.

Regarding raw materials, special grade reagents manufactured by Kanto Chemical Co., Inc. were used as boric acid, zinc oxide, lithium carbonate, and zirconium oxide. Reagents with a purity of 99.9% manufactured by Shin-Etsu Chemical Co., Ltd. were used as lanthanum oxide, yttrium oxide, and gadolinium oxide. Reagents with a purity of 99.9% or more manufactured by Kojundo Chemical Co., Ltd. were used as tantalum oxide, silicon dioxide, and tungsten oxide.

Regarding the obtained glass, the refractive index $n_d$ at a wavelength of 587.6 nm (d ray), the refractive index $n_c$ at a wavelength of 656.3 nm (C ray), the refractive index $n_F$ at a wavelength of 486.1 nm (F ray), the Abbe's number $\upsilon_d$, the glass transition temperature $T_g$ (unit: ° C.), the liquidus temperature $T_L$ (unit: ° C.), the time (devitrification start time) until crystals precipitate at the liquidus temperature $T_L$ or lower, and the specific gravity d were measured. Methods of measuring these values will be described below.

Thermophysical properties (glass transition temperature $T_g$): the sample, processed into a cylindrical shape having a diameter of 5 mm and a length of 20 mm, was measured using a thermomechanical analysis apparatus (manufactured by Bruker AXS, trade name: TD5000SA) at a temperature rise rate of 5° C./min.

Optical constants (refractive index $n_d$, Abbe's number $\upsilon_d$): the sample, processed into a cuboid shape having one side of 20 mm and a thickness of 10 mm, was measured using a high-precision refractometer (manufactured by Shimadzu Device Corporation, trade name: KPR-2000). The Abbe's number $\upsilon_d$ was obtained according to an expression of $\{(n_d-1)/(n_F-n_C)\}$ from the refractive index $n_d$ at a wavelength of 587.6 nm (d ray), the refractive index $n_c$ at a wavelength of 656.3 nm (C ray), and the refractive index $n_F$ at a wavelength of 486.1 nm (F ray).

Liquidus temperature $T_L$: the glass, processed into a cuboid shape having one side of 10 mm, was placed on a platinum dish, was left to stand for 1 hour in an electric furnace set at a given temperature, and was taken out. The sample was observed by an optical microscope at a magnification of 100 times. The minimum temperature at which the precipitation of crystals was not observed was set as the liquidus temperature $T_L$.

Specific Gravity d: approximately 20 g of cut glass was measured using a specific gravity meter (manufactured by Shimadzu Corporation, trade name: SGM300P) according to the Archimedes method using water.

Devitrification start time: the value measured using the above-described thermocouple apparatus at 1000° C.

Appearance: preforms of the glass according to Examples 1 to 4 were prepared and transmission images thereof were observed at a given magnification to check whether or not there were striae or Devitrification. The preforms were prepared by melting glass raw materials in a platinum tank at a high temperature; reducing a molten liquid temperature to 1000° C. to cause the molten liquid to flow through a pipe; dropping the molten liquid from a platinum nozzle; and cooling the molten liquid in a receiving mold.

TABLE 1

|  |  | Ex. 1 | Ex. 2 | Ex. 3 | Ex. 4 | Ex. 5 | Ex. 6 |
|---|---|---|---|---|---|---|---|
| Glass Composition (Mass %) | $B_2O_3$ | 13.1 | 13.3 | 13.6 | 12.7 | 11.1 | 11.1 |
|  | $SiO_2$ | 6.4 | 5.7 | 4.9 | 6.8 | 4.3 | 4.3 |
|  | ZnO | 12.4 | 13.1 | 9.7 | 9.9 | 18 | 18.1 |
|  | $Ta_2O_5$ | 10.4 | 12.7 | 10.4 | 9.4 | 11 | 11 |
|  | $Li_2O$ | 0.3 | 0.4 | 0.4 | 0.4 | 0 | 0 |
|  | $ZrO_2$ | 3.9 | 3.0 | 0 | 3.8 | 2.8 | 3.7 |
|  | $WO_3$ | 8.5 | 6.9 | 10.4 | 9.4 | 12.1 | 10.6 |
|  | $La_2O_3$ | 35.1 | 34.1 | 34.3 | 35.6 | 35.6 | 35.7 |
|  | $Gd_2O_3$ | 9.4 | 10.0 | 13.5 | 9.6 | 0 | 0 |
|  | $Y_2O_3$ | 0.6 | 0.8 | 2.8 | 2.5 | 4.9 | 5.3 |
|  | $Ga_2O_3$ | 0 | 0 | 0 | 0 | 0.2 | 0.2 |
| $La_2O_3/Y_2O_3$ |  | 60 | 42 | 12 | 14 | 7 | 7 |
| $n_d$ |  | 1.84871 | 1.8506 | 1.8517 | 1.8498 | 1.8793 | 1.8803 |
| $\upsilon_d$ |  | 40.01 | 40.05 | 40.2 | 40.1 | 37 | 37.3 |
| Tg |  | 610 | 604 | 616 | 621 | 615 | 618 |
| Liquidus Temperature $T_L$ (° C.) |  | 1070 | 1060 | 1100 | 1050 | 1120 | 1140 |
| Devitrification Start Time (sec) at 1000° C. |  | 3000 | 1400 | Immediately | 200 | — | — |
| Appearance | Devitrification | None | None | Observed | Observed | — | — |
|  | Striae | None | None | — | — | — | — |

TABLE 2

|  |  | Ex. 1 | Ex. 2 | Ex. 3 | Ex. 4 | Ex. 5 | Ex. 6 |
|---|---|---|---|---|---|---|---|
| Glass Composition (Mol %) | $B_2O_3$ | 27.6 | 28.3 | 31.0 | 27.3 | 23.3 | 23.1 |
|  | $SiO_2$ | 15.5 | 14.2 | 12.9 | 16.8 | 10.5 | 10.5 |
|  | ZnO | 22.3 | 23.9 | 18.9 | 18.2 | 32.4 | 32.4 |
|  | $Ta_2O_5$ | 3.1 | 3.8 | 3.4 | 2.9 | 3.6 | 3.6 |
|  | $Li_2O$ | 1.5 | 1.7 | 2.1 | 2.0 | 0 | 0 |
|  | $ZrO_2$ | 4.6 | 3.6 | 0 | 4.6 | 3.4 | 4.3 |
|  | $WO_3$ | 5.4 | 4.4 | 7.1 | 6.1 | 7.6 | 6.6 |
|  | $La_2O_3$ | 15.8 | 15.5 | 16.7 | 16.4 | 15.9 | 15.9 |
|  | $Gd_2O_3$ | 3.8 | 4.1 | 5.9 | 4.0 | 0 | 0 |
|  | $Y_2O_3$ | 0.4 | 0.5 | 2.0 | 1.7 | 3.2 | 3.4 |
|  | $Ga_2O_3$ | 0 | 0 | 0 | 0 | 0.1 | 0.1 |
| $La_2O_3/Y_2O_3$ |  | 41.3 | 28.8 | 8.5 | 9.9 | 5.0 | 4.7 |

While the invention has been described in detail with reference to specific embodiments thereof, it will be apparent to one skilled in the art that various changes and modifications can be made therein without departing from the spirit and scope thereof.

The present application is based on Japanese Patent Application No. 2012-162535 filed on Jul. 23, 2012, and the contents are incorporated herein by reference.

What is claimed is:

1. An optical glass comprising, in terms of mass % on a basis of oxides:
   $B_2O_3$: 10% to 20%,
   $SiO_2$: 0.5% to 12%,
   ZnO: 5% to 19%,
   $Ta_2O_5$: 3% to 17%,
   $Li_2O$: 0.2% to 3%,
   $ZrO_2$: 0.6% to 4.9%,
   $WO_3$: 6.1% to 20%,
   $La_2O_3$: 32.5% to 50%, and
   $Y_2O_3$: 0.2% or more, and
   wherein a mass fraction of a content of $La_2O_3$ to a content of $Y_2O_3$ in terms of mass % is 40 or higher, and
   wherein the optical glass has a refractive index $n_d$ of 1.83 to 1.88 and an Abbe's number $\upsilon_d$ of 39 to 42.

2. The optical glass according to claim 1, having a liquidus temperature $T_L$ of 1,100° C. or lower.

3. The optical glass according to claim 2, wherein the liquidus temperature $T_L$ of the glass is from greater than 1,000 to 1,100° C. and wherein said mass fraction of a content of $La_2O_3$ to a content of $Y_2O_3$ in terms of mass % is 42 or higher.

4. The optical glass according to claim 3, wherein a devitrification start time of said glass in molten form at 1000° C. as measured by a hot-thermocouple method is 750 seconds or longer.

5. The optical glass according to claim 3, wherein a devitrification start time of said glass in molten form at 1000° C. as measured by a hot-thermocouple method is 1000 seconds or longer.

6. The optical glass according to claim 3, wherein a devitrification start time of said glass in molten form at 1000° C. as measured by a hot-thermocouple method is 1250 seconds or longer.

7. The optical glass according to claim 3, comprising, in terms of mass % on a basis of oxides: ZnO: 5% to 13.1%.

8. The optical glass according to claim 7, further comprising, in terms of mass % on a basis of oxides: $Gd_2O_3$: 2% to 13%.

9. The optical glass according to claim 1, wherein a total content of $Ta_2O_5$ and $La_2O_3$ is greater than 45 mass %.

10. The optical glass according to claim 1, wherein a devitrification start time of said glass in molten form at 1000° C. as measured by a hot-thermocouple method is 500 seconds or longer.

11. A preform for press-molding, comprising:
   the optical glass according to claim 1.

12. An optical element obtained by a process comprising press-molding the preform according to claim 11.

13. The optical glass according to claim 1, comprising, in terms of mass % on a basis of oxides: ZnO: 5% to 13.1%.

14. The optical glass according to claim 1, further comprising, in terms of mass % on a basis of oxides: $Gd_2O_3$: 0% to 15%.

15. The optical glass according to claim 1, further comprising, in terms of mass % on a basis of oxides: $Gd_2O_3$: 2% to 13%.

* * * * *